US005910251A

United States Patent [19]
Allen et al.

[11] Patent Number: 5,910,251
[45] Date of Patent: Jun. 8, 1999

[54] WASTEWATER TREATMENT PROCESS AND APPARATUS FOR HIGH FLOW FLUORIDE REMOVAL

[75] Inventors: Stephen D. Allen, Holladay; Leonard Rees Lyman, South Jordan, both of Utah

[73] Assignee: Microbar Incorporated, Sunnyvale, Calif.

[21] Appl. No.: 08/957,053

[22] Filed: Oct. 24, 1997

Related U.S. Application Data

[62] Division of application No. 08/756,681, Nov. 26, 1996.

[51] Int. Cl.$^6$ .................................. C02F 1/44; C02F 1/56
[52] U.S. Cl. .......................... 210/638; 210/639; 210/651; 210/652; 210/728; 210/734; 210/735; 210/915
[58] Field of Search .................................. 210/638, 639, 210/650, 651, 652, 728, 734, 735, 915

[56] References Cited

U.S. PATENT DOCUMENTS

| | | | |
|---|---|---|---|
| 1,324,118 | 12/1919 | Hottinger et al. | 210/702 |
| 3,075,645 | 1/1963 | Riddick | 210/197 |
| 3,097,163 | 7/1963 | Riddick | 210/53 |
| 3,101,317 | 8/1963 | Starry | 210/52 |
| 3,521,752 | 7/1970 | Lindman | 210/56 |
| 3,544,476 | 12/1970 | Aiba et al. | 252/175 |
| 4,159,246 | 6/1979 | Matsumoto | 210/47 |
| 4,188,291 | 2/1980 | Anderson | 210/652 |
| 4,207,183 | 6/1980 | Herrigel | 210/651 |
| 4,246,102 | 1/1981 | Hjelmner et al. | 210/704 |
| 4,260,493 | 4/1981 | Kretas et al. | 210/714 |
| 4,420,401 | 12/1983 | Kretas et al. | 210/714 |
| 4,618,429 | 10/1986 | Herrigel | 210/652 |
| 4,731,187 | 3/1988 | Moriya et al. | 210/719 |
| 4,780,211 | 10/1988 | Lien | 210/644 |
| 4,938,876 | 7/1990 | Ohsol | 210/708 |
| 4,957,634 | 9/1990 | Bowers, Jr. | 210/711 |
| 5,043,072 | 8/1991 | Hitotsuyanagi | 210/638 |
| 5,078,900 | 1/1992 | Wegner | 210/638 |
| 5,108,620 | 4/1992 | Wester et al. | 210/725 |
| 5,164,095 | 11/1992 | Sparapany et al. | 210/735 |
| 5,171,453 | 12/1992 | Communal | 210/735 |
| 5,182,023 | 1/1993 | O'Conner | 210/652 |
| 5,205,939 | 4/1993 | Syrinek | 210/727 |
| 5,215,632 | 6/1993 | Fitts et al. | 204/95 |
| 5,246,686 | 9/1993 | Cuer et al. | 423/467 |
| 5,501,798 | 3/1996 | Al-Samadi | 210/652 |
| 5,510,040 | 4/1996 | Miller | 210/912 |
| 5,556,545 | 9/1996 | Volchek | 210/651 |
| 5,575,915 | 11/1996 | Nakamura | 210/651 |
| 5,605,633 | 2/1997 | Nakamura | 210/732 |

OTHER PUBLICATIONS

S. A. Wasay, B. K. Puri and I. Haq, "Removal of Trace Heavy Metals by Metal Chelates", *Intern. J. Environmental Studies*, vol. 36, pp. 191–197 (1990).

G.B. Harris and S. Monette, "The Stability of Arsenic–Bearing Residues", presented at *TMS–AIME Symposium*, pp. 1–20 (Jan. 25–29, 19881).

(List continued on next page.)

*Primary Examiner*—Ernest G. Therkorn
*Attorney, Agent, or Firm*—Madson & Metcalf

[57] ABSTRACT

A process and system for removing heavy metals, fluoride, silica and other contaminants from large volumes of wastewater is disclosed. In the process, a wastewater stream containing the contaminant is treated with a chemical coagulant to create a particle having a diameter greater than 5 microns. Treated wastewater is passed through a microfiltration membrane which physically separates the metal contaminant particle from the wastewater. Commercially available microfiltration membranes having a pore size from 0.5 micron to 5 microns may be used. The treated wastewater flow rate through the microfiltration membranes can range from 700 gallons per square foot of membrane per day ("GFD") to 1500 GFD. Solids are removed from the membrane surface by periodically backflushing the microfiltration membranes and draining the filtration vessel within which the membranes are located. The dislodged solid material within the filtration vessel is flushed into a holding tank for further processing of the solids.

19 Claims, 2 Drawing Sheets

OTHER PUBLICATIONS

T. Tesumi, M. Sumi, M. Tanaka and T. Shono, "Direct Reaction of Metal Powders with Several Sodium Dithiocarbamates", *Polyhedron* vol. 5, pp. 707–710 (Sep. 2, 1985).

T. Tetsumi, M. Sumi, M. Tanaka and T. Shono, "Reaction of Copper Powder with Tetraalkylthiuram Disulphides", *Polyhedron,* vol. 4, pp. 1439–1442 (Feb. 6, 1985).

Stanislav Miertus and Vladimir Frecer, Theoretical Study of the Electron Structure and Properties of Dithiocarbamates and their Complexes with Transmition Metals, *Collection Czechoslavak Chem. Commun.,* vol. 49, pp. 2744–2750 (1984).

R. R. Scharfe, V. S. Sastri and C. L. Chakrabarti, "Stablilty of Metal Dithiocarbamate Complexes", *Analytical Chemistry,* vol. 45, pp. 413–415 (Feb. 1973).

Serge J. Joris, Keijo I. Aspila, and Chuni L. Chakrabarti, "On the Monobasic of Dibasic Character of Dithiocarbamic Acids", Analytical *Chemistry,* vol. 41, pp. 1441–1445 (Sep. 1969).

Keijo I. Aspila, Vedula S. Sastri and Chuni L. Chakrabarti, "Studies on the Stability of Dithiocarbamic Acids", *Talanta Review*,vol. 16, pp. 1099–1102 (Feb. 19, 1969).

Adam, Hulanicki, "Complexation Reactions of Dithiocarbamates", *Talanta Review,* vol. 14, pp. 1371–1392 (May 24, 1967).

M. J. Janssen, "The Stability Constants of Metal Complexes of Some N–Dialkyldithiocarbamic Acids—Part II. Copper Complexes in Ethanol/Water Mixtures of Various Compositions", *Recueil,* vol. 76, pp. 827–835 (1957).

M. J. Janssen, "The Stability Constants of Metal Complexes of Some N–Dialkyldithiocarbamic Acids—Part I. Copper Complexes in 75% ($^v/_v$) Ethanol Water", *Recueil,* vol. 75, pp. 1411–1422 (1956).

5,910,251

WASTEWATER TREATMENT PROCESS AND APPARATUS FOR HIGH FLOW FLUORIDE REMOVAL

This application is a divisional of application Ser. No. 08/756,681, filed Nov. 26, 1996.

FIELD OF THE INVENTION

The present invention relates to the treatment and purification of wastewater at high flow rates. More particularly, the present invention relates to process and apparatus for removing heavy metal and certain non-metal contaminants from large quantities of wastewater.

BACKGROUND OF INVENTION

Many manufacturing operations generate extremely large quantities of water containing heavy metals or other contaminants. For instance, mining drawdown wells which are used to dewater deep mining operations are known to generate up to 75,000 gallons per minute (gpm) of water. Often this water contains heavy metals or other impurities which must be removed from the water before it can be safely discharged into the environment.

Current techniques for treating drawdown wastewater include large settling ponds, clarifiers, and sand filter systems utilizing iron or aluminum chemistry with large quantities of polymer additives. Such systems are able to demonstrate 90% compliance to discharge regulations. For example, arsenic cannot be safely discharged into the environment unless its concentration is less than 50 ppb ("parts per billion"). If influent arsenic levels are greater than 300 ppb, clarifier and sand filter systems are not able to consistently provide discharge levels less than 50 ppb. To achieve this level of arsenic reduction, chemical coagulants are required to form heavy and large particles, typically greater than 200 microns in size. However, such systems are subject to biological fouling, sand settling, and upsets. Upsets result in out of compliance water. In addition, system maintenance is extensive, with very large land areas required for the system installation.

Filters have been considered to remove metal contaminants from wastewater. For example, traditional microfiltration membranes have a pore size of about 0.5 microns with a flux rate of 100–200 GFD ("gallons per square foot of membrane per day"). At this flux rate, it would be necessary to have a membrane of at least 180,000 square feet to process 25,000 gpm of wastewater. If the wastewater flow rate is 75,000 gpm, then the membrane size would need to be at least 540,000 square feet. Such membrane sizes are prohibitively large and expensive.

It would be a significant advancement in the art to provide a process and system for removing metals and other contaminants from large quantities of wastewater.

It would be a major advancement in the art to provide a process and system for removing metals and other contaminants from large quantities of wastewater which do not require large land areas.

It would also be an important advancement in the art to provide a process and system for removing metals and other contaminants from large quantities of wastewater which consistently complies with environmental discharge requirements.

Such processes and systems are disclosed and claimed herein.

SUMMARY OF THE INVENTION

The present invention is directed to a process for removing metal and certain non-metal contaminants from large volumes of wastewater. In the process, a wastewater stream containing a contaminant is treated with a chemical coagulant. Typical metal contaminants found in mining and other industrial wastewater streams include silver (Ag), arsenic (As), gold (Au), barium (Ba), cadmium (Cd), chromium (Cr), copper (Cu), mercury (Hg), nickel (Ni), lead (Pb), zinc (Zn), fluoride (F$^-$), and silica (SiO$_2$). The present invention can readily be adapted for removing other metals and contaminants found in wastewater by using suitable coagulant chemistry. The coagulant reacts with the contaminant to form a particulate having a size greater than about 5$\mu$.

Known and novel chemical coagulants are available to achieve the desired particulate formation. For instance, ferric sulfate, ferrous sulfate, aluminum sulfate, sodium aluminate, and aluminum and iron polymers are well known inorganic coagulants. Organic and polymeric coagulants can also be used, such as polyacrylamides (cationic, nonionic, and anionic), epi-dma's (epi-dimethylamines), DADMAC's (polydiallydimethylammonium chlorides), copolymers of acrylamide and DADMAC, natural guar, etc. Some coagulants, such as boro-hydrides, are selective for certain metals. The stoichiometric ratio of coagulant to metal or non-metal contaminant is preferably optimized to result in acceptable contaminant removal at minimum coagulant cost. The required coagulant concentration will depend on several factors, including metal contaminant influent concentration, wastewater flow rate, metal contaminant effluent compliance requirement, coagulant/contaminant reaction kinetics, etc. For metal contaminants, the ratio of coagulant to metal contaminant is typically in the range from 3.1 to 16.1. Arsenic, for example, requires a 6:1 to 10:1 (ferric coagulant: arsenic) ratio, lead requires a 3:1 to 8:1 coagulant:metal ratio, zinc uses about 4:1 coagulantugmetal ratio, while copper typically requires a coagulant:metal ratio in the range from 3:1 to 8:1. Fluoride and silica typically have a ratio of coagulant to contaminant in the range from 2:1 to 30:1, depending on the system.

Treated wastewater is passed through a microfiltration membrane which physically separates the metal contaminant from the wastewater. Suitable microfiltration membranes are commercially available from manufacturers such as W. L. Gore, Koch, and National Filter Media (Salt Lake City, Utah). For instance, one GOR-TEX® membrane used in the present invention is made of polypropylene felt with a sprayed coating of teflon. The teflon coating is intended to promote water passage through the membrane. Such microfiltration membrane material has been found to be useful for many wastewater treatment systems. However, when used in a system for removing fluoride or silica, it has been observed that the coagulated particles adhere to the exterior and interior surface and plug the membrane. Backflushing was not effective in such cases.

The microfiltration membranes are used in a tubular "sock" configuration to maximize surface area. The membrane sock is placed over a slotted tube to prevent the sock from collapsing during use. A net material is placed between the membrane sock and the slotted tube to facilitate flow between the membrane and the slots in the tube. In order to achieve the extremely high volume flow rates, a large number of membrane modules, each containing a number of individual filter socks, are used.

The microfiltration membranes preferably have a pore size in the range from 0.5 micron to 5 micron, and preferably from 0.5 micron to 1.0 micron. By controlling the ratio of coagulant to metal contaminant, 99.99% of the precipitated contaminant particles can be greater than 5 microns. This allows the use of larger pore size microfiltration membranes.

It has been found that the treated wastewater flow rate through 0.5 to 1 micron microfiltration membranes can be in the range from 700 gallons per square foot of membrane per day ("GFD") to 1500 GFD.

Solids are preferably removed from the membrane surface by periodically backflushing the microfiltration membranes and draining the filtration vessel within which the membranes are located. The periodic, short duration back flush removes any buildup of contaminants from the walls of the microfiltration membrane socks. The dislodged solid material within the filtration vessel is flushed into a holding tank for further processing of the solids.

The wastewater treatment system disclosed herein is designed to provide compliance with the contaminant metal discharge effluent limits. Wastewater pretreatment chemistry creates insoluble metal and non-metal contaminant particulates which are efficiently removed by the microfiltration membranes.

DETAILED DESCRIPTION OF THE INVENTION

Figure 1:
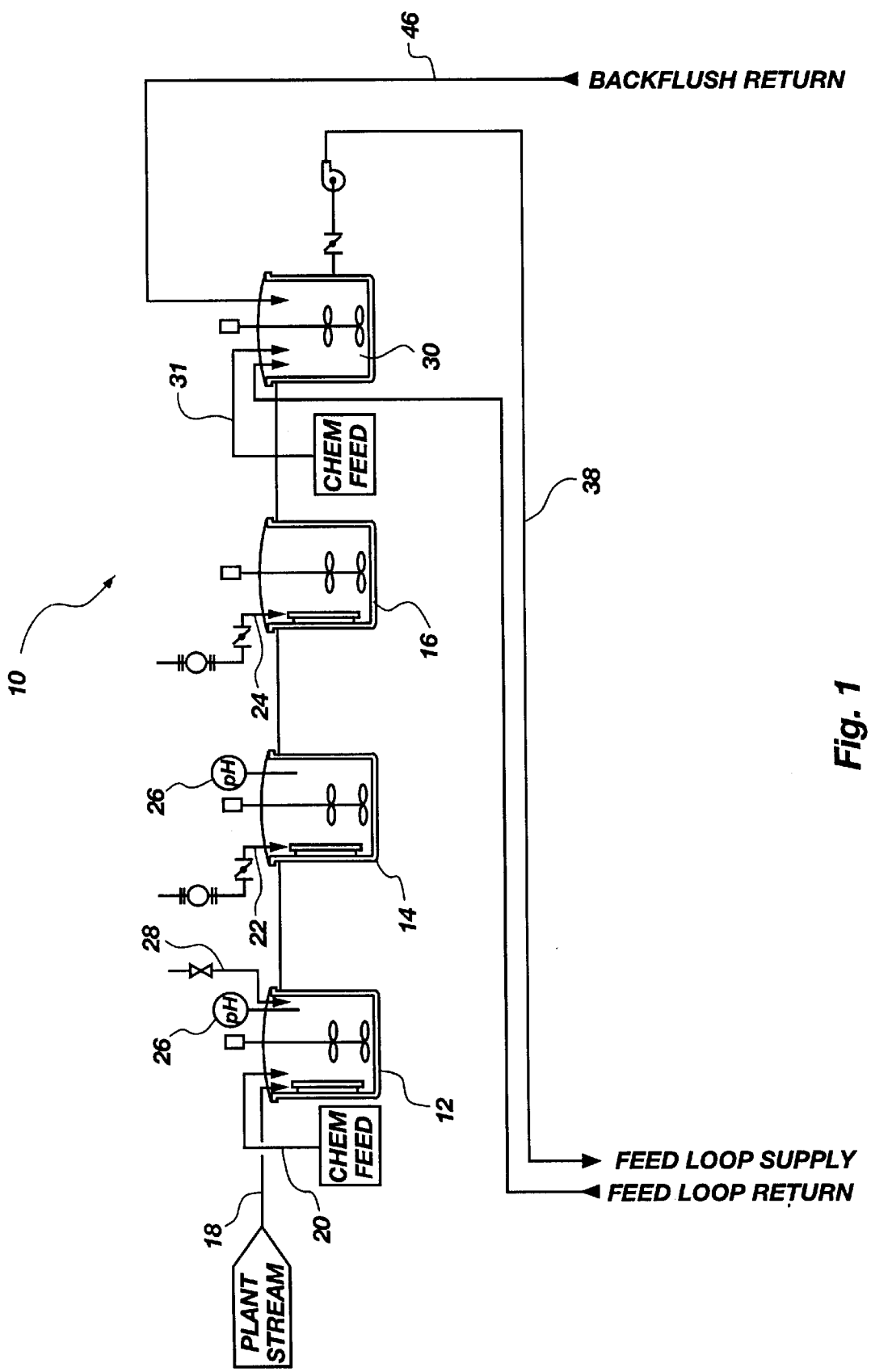
FIG. 1 is a schematic representation of one wastewater pretreatment system.

The present invention is directed to a process for removing metal and certain non-metal contaminants from large volumes of wastewater. In operation, the wastewater is collected and pretreated with one or more chemical coagulants such that the contaminant reacts with the coagulant(s) to form particulates having a size greater than about $5\mu$. The chemical coagulants are preferably mixed with the wastewater using reaction vessels or static in-line mixers, although other mixing methods can be used.

The treated wastewater is then passed through a microfiltration membrane having a pore size in the range from $0.5\mu$ to $5\mu$ to remove the contaminant particulates. In such a system, wastewater flow rates in the range from 700 gallons per square foot of membrane per day ("GFD") to 1500 GFD are possible. The microfiltration membrane is periodically backflushed to remove solids from the membrane surface. The rejected solids are gravity collected in the filter vessel bottom and time cycle discharged to a settling tank for further sludge processing.

The microfiltration membranes are preferably provided in a cassette arranged module. The microfiltration membranes provide a positive particle separation in a high recovery dead head filtration array. The dead head filtration operates effectively at low pressures (4 psi to 15 psi, preferably 5 psi to 10 psi) and high flow rates, allowing 100% discharge of the supplied water with no transfer pumps needed. Solids which settle on the wall of the membrane during filtration are periodically backflushed away (and gravity settled) from the membrane surface to ensure a continuously clean filtration area. The individual cassette module design allows for easy replacement of the membrane modules.

Currently preferred filter socks useful with the present invention contain a teflon coating on a polypropylene or polyethylene felt backing material. Such socks are available from W. L. Gore. Another presently preferred filter sock manufactured by National Filter Media, Salt Lake City, Utah, consists of a polypropylene woven membrane bonded to a polypropylene or polyethylene felt backing. Membrane "failure" is due primarily to flux rate loss, not mechanical failure. Many operations deem it more cost-effective to replace the membrane socks instead of cleaning contaminants from the membrane.

The membrane life is important to the continuous operation and operational cost of the filtration system. The membranes manufactured by W. L. Gore and National Filter Media, Salt Lake City, Utah have a 6 to 24 month life with no catastrophic failures in industrial conditions at a temperature of 160° F. and a pH greater than 13. Anticipated operating conditions for the present invention are ambient temperature and pH between 7 and 11. It is expected that membranes used according to the present invention will have a life equal to or greater than 18 months. The filtration system operates at a low pressure, preferably between 4 and 15 psi. Greater pressures are possible; however, the higher the pressure, the quicker the membrane loss of flux rate. The operating pressure is preferably below 25 psi.

The following examples are offered to further illustrate the present invention. These examples are intended to be purely exemplary and should not be viewed as a limitation on any claimed embodiment.

EXAMPLE 1

Using a 50 gallon per minute (gpm) pilot scale system, actual mine draw-down wastewater containing arsenic contaminant was processed according to the present invention. Ferric sulfate (at a ratio of 8:1 Fe:As) was used as the coagulant. DADMAC ((poly) diallyldimethylammonium chloride) and a copolymer of acrylamide and DADMAC were used at a concentration of 1 ppm (parts per million). The DADMAC was used as a 20% liquid and the DADMAC acrylamide copolymer was used as a 10% liquid. The membrane was obtained from W. L. Gore having a teflon coating and a nominal pore size range of $0.5\mu$. The flux rate ranged from 430 to 600 GFD at an operating pressure less than 10 psi. The results are reported below in Table 1.

TABLE 1

All Values are in Parts Per Billion (ppb)

| | Arsenic Influent | | | Arsenic Effluent | | |
|---|---|---|---|---|---|---|
| Time Period | Mean | High | Low | Mean | High | Low |
| A | 331 | 429 | 247 | 13.3 | 82 | 0 |
| B | 270 | 375 | 165 | 5.3 | 15 | 0 |
| C | 279 | 369 | 231 | 7.0 | 24 | 0 |
| D | 278 | 278 | 278 | 2.7 | 7 | 0 |
| E | 244 | 268 | 197 | 4.9 | 14 | 0 |

EXAMPLE 2

A 15 gpm pilot scale system was used to process wastewater containing fluoride and a combined flow of fluoride and silica. A 38% sodium aluminate solution at a ratio of 0.23:1 Al:F and 50% aluminum chlorohydrate at a dose of 35 ppm to aid in the removal of the fluoride, total dissolved solids (TDS), total suspended solids (TSS), and some of the other present salt forms. The precipitate was flocculated with a medium charge (25±5 mole percent), medium molecular weight anionic polyacrylamide polymer for ease of filtering or settling. This yielded very low to non-detectable effluent values of fluoride and Silt Density Indices (SDI) below 3.0. The filtration membrane was a $0.5\mu$ polypropylene bonded membrane obtained from National Filter Media. The membrane flux rate was measured at 650 to 800 GFD at a vessel operating pressure less than 9 psi. The results are reported below in parts per million.

| Time Period | Influent F | Effluent F |
|---|---|---|
| A | 130.0 | 1.86 |
| B | 191.5 | 21.7 |
| C | 142.2 | 2.13 |
| D | 120.0 | 0.72 |
| E | 156.5 | 1.41 |
| F | 125.7 | 0.79 |
| G | 60.93 | 0.97 |
| H | 206.25 | 0.95 |
| I | 133.3 | 0.39 |
| J | 112.9 | 0.85 |
| K | 78.2 | 3.96 |
| L | 133.5 | 3.96 |
| Average | 132.6 | 3.8 |
| Min | 60.93 | 0.39 |
| Max | 206.25 | 21.7 |

| Time Period | Influent F + $SiO_2$ | Effluent F + $SiO_2$ |
|---|---|---|
| A | 264.0 | 0.24 |
| B | 172.0 | 0.26 |
| C | 140.0 | 0.31 |
| D | 153.0 | 0.39 |
| E | 98.0 | 0.36 |
| F | 89.0 | 0.29 |
| Average | 152.7 | 0.31 |
| Min | 89.0 | 0.24 |
| Max | 264.0 | 0.39 |

EXAMPLE 3

A 15 gpm pilot scale system was used to process wastewater containing silica. The silica was present in dissolved and colloidal silica forum in the waste stream. A 38% sodium aluminate solution at a ratio of 0.45:1 Al:Si, 46% aluminum sulfate at constant dose of 45 ppm, 50% aluminum chlorohydrate at a dose of 25 ppm, and a 20% epichlorohydrin/dimethylamine (a high charged, low molecular weight cationic epi-DMA product) at a dosage of 0.25–1.0 ppm to aid in the removal of the silica, TDS and TSS. This formed a well defined particle for filtering or settling. This yielded very low to non-detectable effluent values of the silica and Silt Density Indices (SDI) below 3.0. The filtration membrane was a 0.5 micron polypropylene felt with a PTFE (polytetrafluroethylene coating obtained from W. L. Gore. The membrane flux rate ranged from 500 GFD to 900 GFD at a vessel operating pressure less than 9 psi. The results are reported below in parts per million.

| Time Period | Influent $SiO_2$ | Effluent $SiO_2$ |
|---|---|---|
| A | 140 | 0.443 |
| B | 160 | 0.33 |
| C | 125 | 0.37 |
| D | 153 | 0.39 |
| E | 177 | 0.36 |
| F | 165 | 0.29 |
| Average | 153 | 0.364 |
| Min | 125 | 0.29 |
| Max | 177 | 0.443 |

EXAMPLE 4

A 15 gallon per minute (gpm) pilot scale system was used to process wastewater containing copper and lead in a combined waste flow. The copper and lead removal system employed the use of a blend of sodium thiocarbonate and sodium aluminate which was fed at a ratio of 3.2:1 (thiocarbonate to combined metal concentration of copper and lead as measured by atomic absorption). The precipitate was flocculated with a medium charge, medium molecular weight polyacrylamide polymer for ease of filtering or settling. This yielded a very low to non-detectable effluent values of copper and lead in the effluent. The membrane was a 1.0 micron polypropylene needled monoelement obtained from National Filter Media. The membrane flux rate was estimated to be 1000 GFD at vessel pressures from 4.5 to 6.0 psi. The results are reported below in parts per million:

| | Lead | | Copper | |
|---|---|---|---|---|
| Time Period | Influent | Effluent | Influent | Effluent |
| A | 3.2 | 0.11 | 28.0 | N.D. |
| B | 2.85 | 0.14 | 32.98 | 0.032 |
| C | 3.66 | 0.109 | 21.31 | 0.045 |
| D | 2.45 | 0.15 | 23.0 | 0.023 |
| E | 3.0 | 0.10 | 28.0 | N.D. |
| F | 2.4 | 0.09 | 35.0 | N.D. |
| G | 3.8 | N.D. | 35.11 | 0.07 |
| H | 2.76 | 0.10 | 33.0 | 0.055 |
| I | 4.12 | N.D. | 27.27 | 0.11 |
| J | 2.65 | 0.12 | 24.6 | N.D. |
| Average | 3.09 | 0.09 | 28.82 | 0.0335 |
| Min | 2.4 | N.D. | 21.31 | N.D. |
| Max | 4.12 | 0.15 | 35.11 | 0.11 |

Reference is made to FIG. 1 which illustrates one possible wastewater pretreatment system 10 within the scope of the present invention. The illustrated wastewater pretreatment system 10 includes a plurality of pretreatment reactor vessels 12, 14, and 16 which enable the wastewater feed stream 18 to chemically react with one or more chemical coagulants. Chemical coagulants which react with contaminants in the wastewater feed stream 18 are introduced into the pretreatment reactor vessels via chemical coagulant feed streams 20, 22, and 24. The pH within the pretreatment reactor vessels is preferably monitored with a pH sensor 26. Acid or base can be added to the pretreatment reactor vessels, if necessary, to adjust the pH via acid/base feed stream 28.

The number of pretreatment reactor vessels can vary depending on the number of chemical coagulants being used and the reaction chemistry used to form the waste particulates. The size of the reactor vessels can be varied to provide different reaction times.

Figure 2:
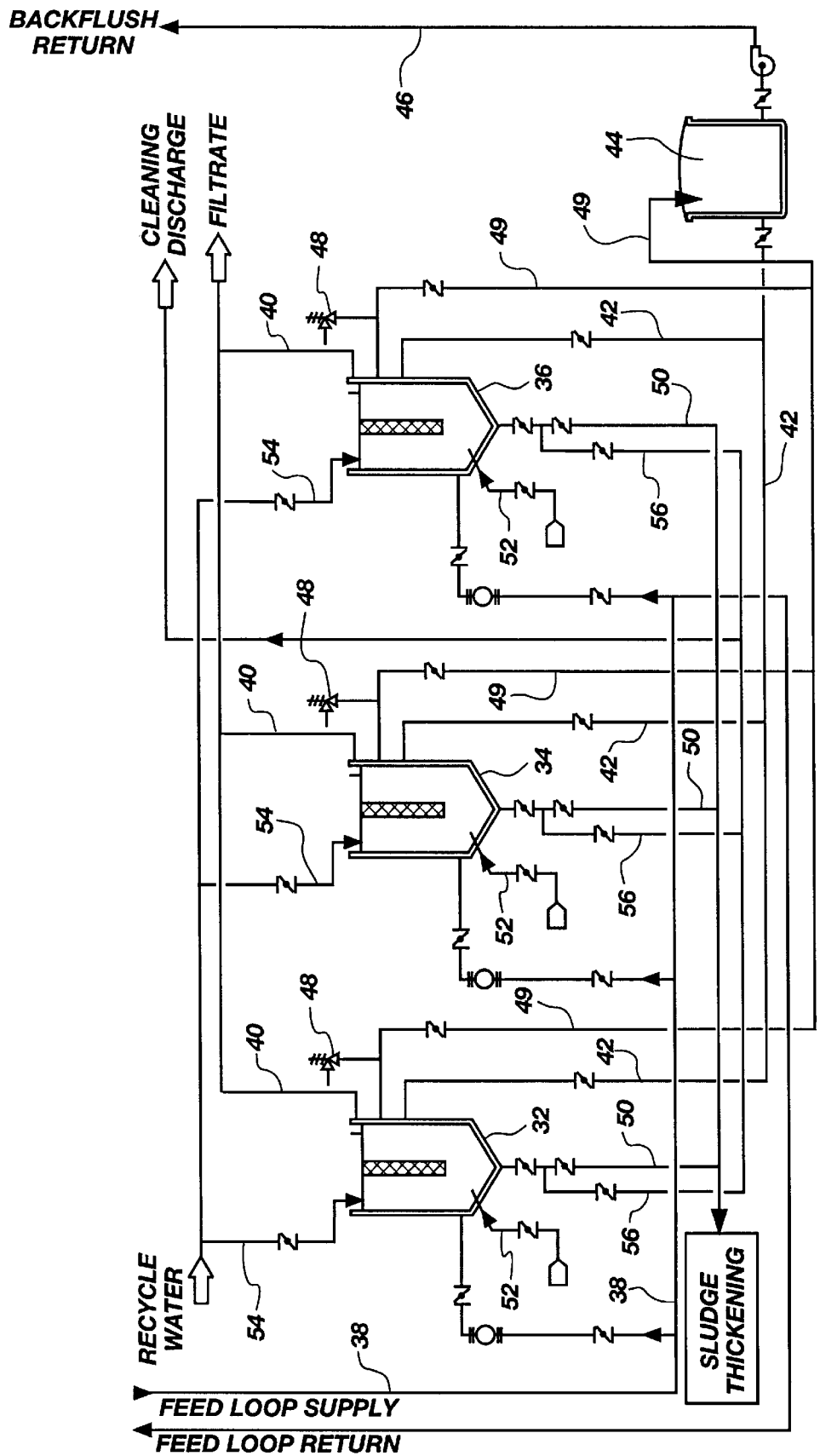
FIG. 2 is a schematic representation of one wastewater microfiltration apparatus for high flow impurity removal.

After flowing through the necessary pretreatment reactor vessels, the wastewater feed stream flows into a feed tank 30 for holding the pretreated wastewater. Additional chemical coagulants can be added directly to the feed tank 30, if necessary, via a chemical coagulant feed stream 31. As shown in FIG. 2, the pretreated wastewater is directed to one or more filtration vessels 32, 34, and 36 via filtration vessel feed stream 38. The size of feed stream 38 will depend on the designed flow rate of the filtration vessel. For example, in a system having 5 filtration vessels, each handling 2500 gpm, a 24 inch feed line to the system is suitable. Each filtration vessel 32, 34, and 36 is a stand alone filtration device. The number and size of each filtration vessel can vary depending on the system capacity requirements. The filtrate is removed from each filtration vessel via a filtrate stream 40.

Each filtration vessel preferably provides a mounting platform for from 9 to 24 filter cassette modules. One currently preferred filter cassette module contains 16 individual sock filters configured with 0.5 micron filtration membranes. The rated flow rate is 0.9 gpm per square foot of membrane area. Each full cassette module has 64 square feet of membrane area and is rated at 58 gpm with a differential pressure less than 15 psi. A lifting mechanism is preferably included to allow removal and replacement of the membrane cassette modules.

The filtration membranes are periodically backflushed with filtrate to remove solids from the membrane surface. During the backflush procedure, the filtration vessel is taken off line and wastewater is drained from the filtration vessel via a backflush exit stream 42 to a backflush tank 44. The backflush tank 44 provides temporary storage before the backflushed wastewater is conveyed to the feed tank 30 via backflush return stream 46. It is estimated that 400–500 gallons of water will be used during a typical back flush cycle for a 2500 gpm filtration vessel. A vacuum breaker 48 is preferably provided to allow equalization of pressure within the respective filtration vessel 32, 34, or 36 during the backflush procedure. A vent/relief stream 49 is provided to allow venting or release of excess or over-pressurized wastewater.

The filtrate side of the filtration vessel 32, 34, 36 is open to the atmospheric pressure. The filtrate is collected in the top of the filtration vessel and allowed to drain into the filtrate stream 40. This volume of water provides the positive head which, when coupled with the negative head of draining the pressure side of the vessel via backflush exit stream 42, produces enough positive pressure gradient to backflush the filtration membrane.

After sufficient sludge settles within the bottom of the filtration vessel 32, 34, 36, the sludge is removed via a sludge discharge stream 50. While the sludge is removed, the filtration membranes are preferably rinsed with water from a water rinse stream 52. The collected sludge is removed from the system for further processing or storage.

Periodically, the membranes will require soaking to remove trace amounts of organics. Cleaning preferably occurs as needed or as part of a regular maintenance program. The vessel drain opens to remove all contaminant via the sludge discharge stream 50. The cleaning solution is introduced into each filtration vessel through cleaning supply stream 54. Typical cleaning solutions include acids, bases and surfactants. In some cases the filtration vessel can be returned to operation without draining and rinsing the filtration membranes. If membrane rinsing is necessary, the contents of the filtration vessel 32, 34, 36 are removed via cleaning discharge stream 56 for further processing.

As shown in FIG. 2, multiple filtration vessels are preferably used, in parallel, to provide for the required flow rate. However, the filtration vessels can be operated in series to provide primary filtration and secondary filtration. Because filtration vessels are taken off line during the backflushing, additional filtration vessels and capacity are preferably used to ensure that the require discharge flow is maintained. An additional filtration vessel may be supplied to provide for off-line maintenance while the remainder of the system meets the flow rate requirements.

The wastewater treatment system preferably includes access to the various process streams to allow for sampling and analysis. The valves, pumps, and sensors customarily used in the art to safely control the described fluid flow to and from the filtration vessels are preferably provided. Such valves, pumps, and sensors also allow for automation of the process.

From the foregoing, it will be appreciated that the present invention provides a process for removing contaminants from wastewater utilizing a positive physical barrier to precipitated particles. The positive separation barrier permits discharge having lower concentration limits than conventional clarifier/sand filter systems.

The apparatus for removing contaminants from wastewater occupies less space than conventional clarifier/sand filter systems. The apparatus is easily expandable.

The chemical pretreatment achieves particle formation based on size, not weight. As a result, chemical pretreatment costs are lower than those typically required for a clarifier/sand filter.

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

The claimed invention is:

1. A process for removing fluoride from large volumes of wastewater comprising the steps of:

(a) treating a wastewater stream containing fluoride with a coagulant, wherein the coagulant reacts with the fluoride to form a particulate having a size greater than about $5\mu$;

(b) passing the treated wastewater through a microfiltration membrane having a pore size in the range from $0.5\mu$ to $5\mu$, wherein the treated wastewater flow rate is in the range from 700 gallons per square foot of membrane per day ("GFD") to 1500 GFD, such that the fluoride is removed from water passing through the microfiltration membrane; and (c) periodically backflushing the microfiltration membrane to remove solids from the membrane surface.

2. A process according to claim 1, wherein the mole ratio of coagulant to fluoride is in the range from 2:1 to 3:1.

3. A process according to claim 1, wherein the coagulant is aluminum chloride aluminum chlorohydrate, and sodium aluminate.

4. A process according to claim 1, wherein the coagulant is a sodium aluminate solution at a ratio of from 0.2:1 to 5:1 Al:F and aluminum chlorohydrate at a dose of from 30 to 40 ppm.

5. A process according to claim 4, further comprising the step of adding from 20 to 30 mole percent, relative to the fluoride content, medium molecular weight anionic polyacrylamide polymer.

6. A process according to claim 1, wherein the microfiltration membrane comprises polypropylene felt with a coating of polytetrafluoroethylene (PTFE).

7. A process according to claim 1, wherein the microfiltration membrane comprises polypropylene membrane bonded to a polypropylene or polyethylene felt backing.

8. A process according to claim 1, wherein the treated wastewater is passed through the microfiltration membrane at a pressure less than 25 psi.

9. A process according to claim 1, wherein the treated wastewater is passed through the microfiltration membrane at a pressure in the range from about 4 psi to 15 psi.

10. A process according to claim 1, wherein the treated wastewater is passed through the microfiltration membrane at a pressure in the range from about 5 psi to 10 psi.

11. A process according to claim 1, wherein the coagulant is a polyacrylamide.

12. A process according to claim 1, wherein the coagulant is an epichlorohydrin/dimethylamine (epi-dma) polymer.

13. A process according to claim 1, wherein the coagulant is a DADMAC (polydiallydimethylammonium chloride) polymer.

14. A process according to claim 1, wherein the coagulant is a copolymer of an acrylamide and DADMAC (polydiallydimethylammonium chloride).

15. A process according to claim 1, wherein the coagulant is a natural guar.

16. A process for removing fluoride from large volumes of wastewater comprising the steps of:

(a) treating a wastewater stream containing fluoride with an organic polymer coagulant, wherein the coagulant reacts with the fluoride to form a particulate having a size greater than about $5\mu$;

(b) passing the treated wastewater through a microfiltration membrane having a pore size in the range from $0.5\mu$ to $5\mu$, wherein the treated wastewater flow rate is in at least 650 gallons per square foot of membrane per day ("GFD"), such that the fluoride is removed from water passing through the microfiltration membrane; and (c) periodically backflushing the microfiltration membrane to remove solids from the membrane surface.

17. A process according to claim 16, wherein the coagulant is a polyacrylamide.

18. A process according to claim 16, wherein the treated wastewater is passed through the microfiltration membrane at a pressure less than 25 psi.

19. A process according to claim 16, wherein the treated wastewater is passed through the microfiltration membrane at a pressure in the range from about 4 psi to 15 psi.

* * * * *

UNITED STATES PATENT AND TRADEMARK OFFICE
CERTIFICATE OF CORRECTION

PATENT NO   :  5,910,251
DATED       :  June 8, 1999
INVENTOR(S) :  Allen et al.

It is certified that error appears in the above-identified patent and that said Letters Patent is hereby corrected as shown below:

In Column 8, Line 34 after "to" please delete [3:1] and insert --30:1--

Signed and Sealed this

Twenty-seventh Day of June, 2000

Attest:

Q. TODD DICKINSON

Attesting Officer

Director of Patents and Trademarks